April 4, 1961
F. P. STANTON
2,978,169
MEANS FOR PREVENTING THE ACCUMULATION OF
ICE OR OTHER SOLIDS IN DUCTS
Filed Sept. 15, 1958
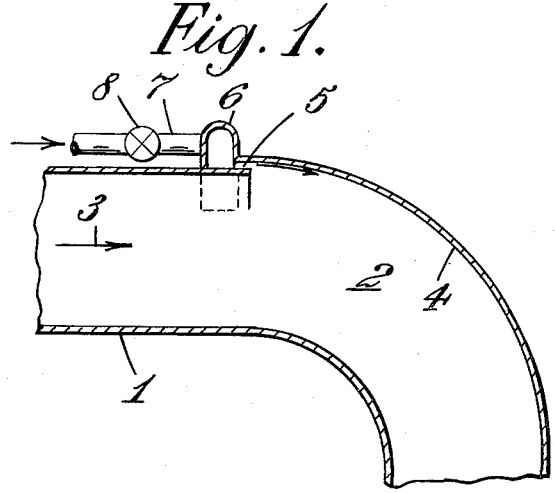
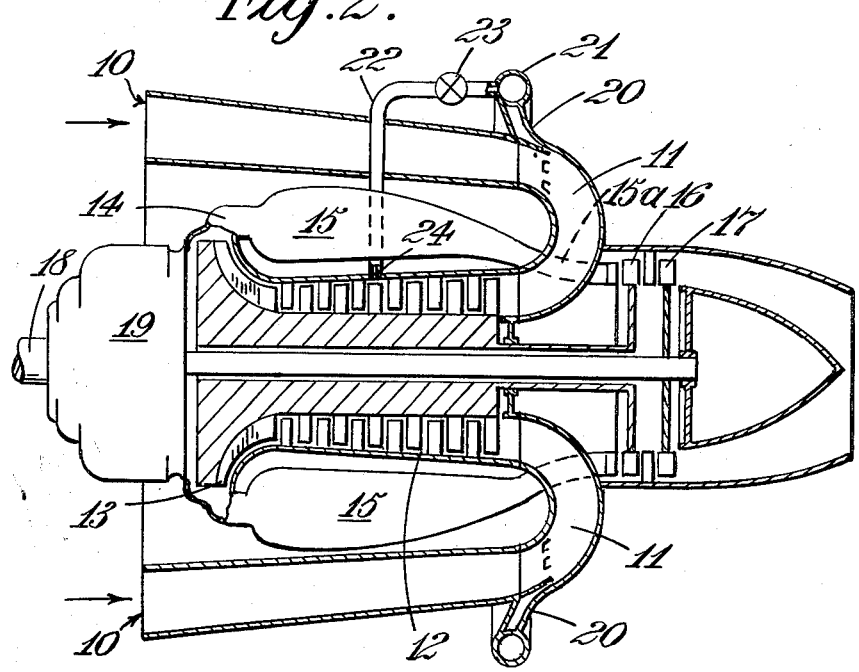

United States Patent Office 2,978,169
Patented Apr. 4, 1961

2,978,169
MEANS FOR PREVENTING THE ACCUMULATION OF ICE OR OTHER SOLIDS IN DUCTS

Francis Patrick Stanton, Bristol, England, assignor, by mesne assignments, to Bristol Siddeley Engines Limited, Bristol, England, a British company Filed Sept. 15, 1958, Ser. No. 760,913

Claims priority, application Great Britain Oct. 3, 1957

6 Claims. (Cl. 230—132)

This invention relates to means for preventing the accumulation of solid material in the bends of ducts which may be called upon to convey a gaseous fluid carrying in suspension particles of the solid material capable of cohering. The particles may be ice crystals for example, which if wet, or accompanied by entrained water particles, are quite capable of cohering and accumulating in a bend.

According to the invention there is provided, in combination with a duct intended for the conveyance of gaseous fluid and having a bend, means for preventing the accumulation in the bend of solid material, coherable particles of which are carried in suspension in the fluid flow, said means comprising, at a position somewhat upstream of the beginning of that part of the wall of the duct, upon which solid material is liable to accumulate, a nozzle or a system of nozzles directed substantially along the wall in the direction of flow of the conveyed fluid around the bend, the nozzle or system of nozzles being arranged and connected to a source capable of providing a supply of gaseous fluid at a pressure sufficiently above the pressure which the conveyed fluid will have when flowing around the bend to produce an outflow of gaseous fluid sheathing the wall on the outside of the bend and maintaining, over the part of the wall upon which the solid material is liable to accumulate, a fluid flow velocity sufficiently in excess of the velocity of the conveyed fluid flowing around the bend to prevent such accumulation.

Preferably the nozzle or each nozzle has an outlet in the form of a narrow slit following the shape of the duct in transverse section.

The invention is primarily intended for use in preventing the accumulation of ice in bends of air intake ducts of aircraft propulsion engines, although other uses may be envisaged.

Thus one form of the invention consists in an aircraft gas turbine propulsion engine comprising an air compressor system having an air intake duct with a bend, and means for preventing the accumulation of ice in the bend, said means comprising, at a position somewhat upstream of the beginning of that part of the wall of the duct upon which ice is liable to accumulate, a nozzle or a system of nozzles directed substantially along the wall in the flow direction of air around the bend, the nozzle or system of nozzles being arranged, and connected through control valve means, to produce an outflow of air compressed in said compressor system, the outflow sheathing the wall of the outside of the bend and maintaining over that part of the wall upon which ice is liable to accumultae, an airflow velocity sufficiently in excess of the velocity of the remaining airflow around the bend to prevent such accumulation.

Where an aircraft gas turbine propulsion engine has an air intake duct with a bend, experience has shown that in certain atmospheric conditions, apparently when both ice crystals and water are present in the air, an accumulation of ice may form in the bend. Not only does this form a blockage in the duct, which is undesirable, but also the ice is liable to become detached in masses of such size as to endanger the blading of the compressor system which is fed with air by the air intake duct.

By employing the present invention such accumulation of ice in the bend may be prevented.

Two embodiments of the present invention will now be described merely by way of example the first with reference to Figure 1 of the accompanying drawings and the second with reference to Figure 2 of the accompanying drawings.

In these drawings:

Figure 1 is a cross-sectional showing a simple (i.e. non-annular) duct having a bend and means for preventing the accumulation of solid material in the bend, and Figure 2 is a cross-section showing an aircraft gas turbine propulsion engine having a partly annular air intake duct with a re-entrant bend, and means for preventing the accumulation of ice in the bend.

In Figure 1, the duct is indicated at 1 and the bend at 2. If a gaseous fluid carrying, in suspension, solid particles which, either owing to their own nature or to the simultaneous presence of a liquid binder, are capable of cohering, is caused to flow along the duct in the direction of the arrow 3, there is a danger that an accumulation of the solid particles will build up on the part 4 of the wall of the duct forming the outside of the bend. Such an accumulation would not normally extend upstream quite to the beginning of the bend. To prevent such an accumulation there is provided in this example a nozzle 5 which is positioned in the part of the duct wall forming the outside of the bend and at the beginning of the bend, the nozzle having an outlet in the form of a narrow slit following the shape of the duct in transverse section and directed along the wall 4 in the direction of flow of the conveyed fluid around the bend. The nozzle forms an outlet from a manifold 6 connected by a pipe 7 containing a control valve 8 to a source of gaseous fluid under sufficient pressure to produce an outflow from the nozzle sheathing the wall on the outside of the bend and maintaining, over the length of the duct upon which accumulation of solid particles is liable to occur, a velocity sufficiently in excess of the velocity of the fluid carrying the solid particles to prevent the particles accumulating on the surface. The mechanism by which such accumulation is prevented is probably that the solid particles, which by their inertia tend to strike the outer wall of the bend, are deflected round the bend as they enter the fast-moving sheath of gaseous fluid so that they are either prevented from reaching the wall, or if some of them reach the wall that they are travelling with such speed of obliquity with respect to the wall that they do not remain adherent to it. Furthermore, if the outflow from the nozzle has sufficient velocity, it will disperse ice already adherent to the wall of the duct when the valve 8 is opened.

For flow velocities in the duct up to 300 feet per second, a nozzle 5 of convergent form, giving with a pressure ratio in excess of about 1.8 an outflow velocity in the nozzle of about Mach 1, has been found satisfactory. With higher flow velocities in the duct, or a greater length of bend to be protected, it may however be advantageous to use a higher pressure ratio and a nozzle of convergent-divergent form in order to produce an outflow having a Mach number greater than unity. There is however some evidence indicating that above certain flow velocities in the duct the danger of solid matter accumulating in bends disappears. If desired the nozzle 5 may be replaced by a system of nozzles arranged side by side in a line in the transverse direction, the system of nozzles being arranged and directed like the nozzle 5, and close enough together for the outflow from them to combine into a sheath of high velocity fluid flowing over the wall of the duct on the outside of the bend. Also, in the case of a bend of considerable length, a succession of nozzles or systems of nozzles may be provided in the wall of the duct forming the outside of the bend and extending around the bend, all the nozzles being connected to discharge gas from the source of gaseous fluid under pressure, and being directed along the wall or substantially along the wall in the direction of flow of conveyed fluid around the bend so as to keep the protective sheath moving with sufficient velocity. The nozzle or nozzles may be provided in a member or members projecting into or across the duct, but in that case, to avoid solid particles accumulating on the upstream sides of such members, they should have sharp leading edges and flanks making an angle of not more than 30° to the direction of approach of the fluid flowing in the dust.

Referring now to Figure 2, the air intake duct of the aircraft gas turbine propulsion engine shown therein is generally indicated at 10. The mouth of the intake duct faces forwardly, and the duct is reversed in direction and divided by re-entrant bends 11 round which the intaken air flows into a fully annular part before entering the compressor system 12 of the engine. From the outlet 13 of the compressor system the direction of the air is again reversed by bends 14 to cause it to flow through combustion equipment 15 and passages 15a passing between the bends 11 to a high pressure turbine 16 driving the compressor and low pressure turbine 17 driving a power output shaft 18 through reduction gearing 19. When icing conditions exist, ice is liable to accumulate in the bends 11. The accumulation does not however extend upstream quite to the beginning of the bends. In part of the outside wall of the duct 10 near the beginning of the bends, a system of narrow slit convergent nozzles 20 is provided the nozzles being arranged in a ring and directed along the wall in the flow direction of air around the bends. The nozzles 20 are all supplied from a manifold 21 which is connected by pipe means 22 containing a control valve 23 to a tapping 24 at an intermediate stage of the compressor system 12 where the pressure is such as to maintain, under normal running conditions, a pressure ratio across the nozzles 20 which is of about 2 : 1. The nozzles 20 are spaced sufficiently closely so that their outflows, which spread after leaving the nozzles, combine to form a protective sheath of high velocity air over the wall on the outside of the bends 11 in the manner already described. The nozzles 20 may however if desired be replaced by a single annular slit nozzle opening from the manifold 21, as will readily be appreciated. In this case the outflow forms a protective sheath of high velocity air extending right up to the nozzle.

The air supplied to the manifold 21 from the compressor 12 will have been heated by compression, and this heat may also assist in dispersing the ice crystals or in preventing their adhesion to the wall of the bend. However, the use of hot gas is not essential to the prevention of accumulation of ice in the bend and in some cases it may be advantageous to pass the air through a cooler before it is discharged into the air intake duct in order to reduce the loss of engine power which accompanies the injection of hot air into the intake of the compressor.

I claim:
1. An aircraft gas turbine propulsion engine comprising an air compressor with an air inlet; an air inlet duct having an inlet at one end, an outlet at the other end of the duct facing in substantially the same direction as the inlet and a bend joining the inlet and the outlet, said inlet being open to atmosphere and said outlet being connected to said air inlet of said compressor; nozzle means opening into said duct near the beginning of said bend, said nozzle means being directed so that flow therefrom is along the inner surface of the outer portion of the wall of said bend away from the inlet of said duct; and supply means for supplying gaseous fluid to said nozzle means at a pressure in excess of the pressure in said bend of said duct.

2. An aircraft gas turbine engine comprising a multistage air compressor having a compressor inlet, said compressor having a stage at which the pressure of the air is double that of the air at the compressor inlet; an air duct having a duct inlet and a duct outlet both facing in the same direction and opposite said compressor inlet and a bend joining said duct inlet and duct outlet, said duct inlet opening to atmosphere and said duct outlet being connected to said compressor inlet; nozzle means opening into said duct near the beginning of said bend, said nozzle means being directed so that flow therefrom is along the inner surface of the outer portion of the wall of said bend away from the duct inlet; and means connecting said nozzle means with said stage.

3. An aircraft gas turbine propulsion engine comprising a power take-off shaft, a multi-stage air compressor having an inlet and an outlet; a high pressure turbine connected to rotate said compressor; a low pressure turbine receiving gases from said high pressure turbine and being connected to drive said power take-off shaft; air duct means having inlet and outlet ends facing in the substantially opposite direction to the compressor inlet and bend forming parts joining said duct inlet and outlet, the inlet being open to atmosphere and the outlet being connected to deliver to the compressor inlet; nozzle means opening into said duct means near the beginning of said bend forming parts and being directed so that flow therefrom is along the inner surface of the outer portion of the wall of said bend forming parts away from said duct inlet; an annulus; means connecting said annulus to said nozzle means, a tapping connecting said annulus with an intermediate stage of said air compressor.

4. An aircraft propulsion engine having an air inlet; an air inlet duct having an inlet at one end, an outlet at the other end of the duct facing in substantially the same direction as the inlet and a bend joining the inlet and the outlet, said inlet being open to atmosphere, and said outlet being connected to said air inlet; nozzle means opening into said duct slightly upstream of said bend and through the outer portion of the wall of said bend, said nozzle means being directed along the length of said air inlet duct away from the inlet of said duct; and supply means for supplying gaseous fluid to said nozzle means at a pressure in excess of the pressure in said bend of said duct.

5. The aircraft propulsion engine of claim 1 further comprising cooling means operatively connected to said supply means to cool gaseous fluids therein.

6. In combination with an aircraft, an air inlet duct having an inlet at one end, an outlet at the other end of the duct facing in substantially the same direction as the inlet and a bend joining the inlet and the outlet, said inlet being open to atmosphere, air consuming means connected to said outlet, nozzle means opening into said duct near the beginning of said bend, said nozzle means being directed so that flow therefrom is along the inner surface of the outer portion of the wall of said duct, and supply means for supplying gaseous fluid to said nozzle means at a pressure in excess of the pressure in said bend of said duct.

References Cited in the file of this patent

UNITED STATES PATENTS

| 2,000,741 | Buckland | May 7, 1935 |
| 2,656,096 | Schwarz | Oct. 20, 1953 |

FOREIGN PATENTS

| 201,686 | Australia | May 2, 1956 |
| 942,261 | Germany | May 3, 1946 |